J. E. Murray.
Cleat.
Nº 90,952. Patented Jun. 8, 1869
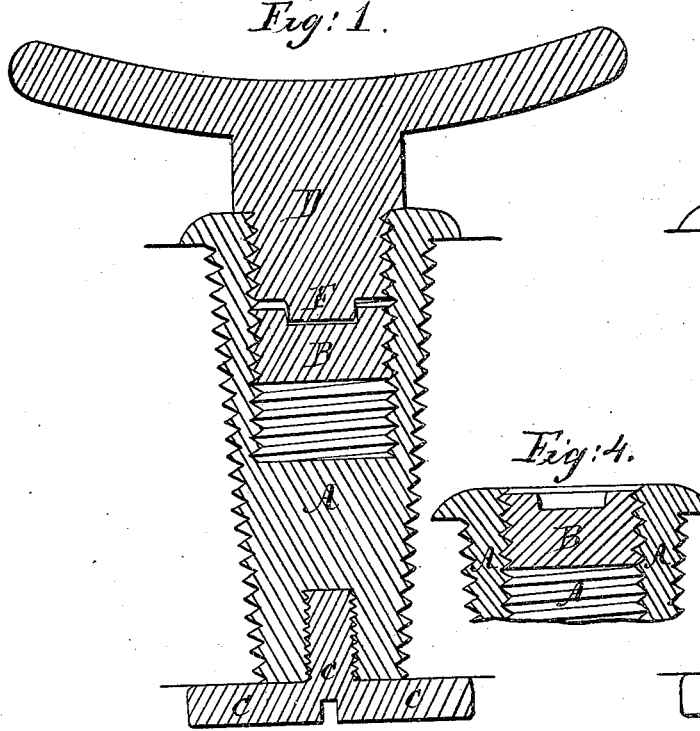
Witnesses.
Chas H. Pattee
J. K. Tyler
Inventor.
John E. Murray

United States Patent Office.

JOHN E. MURRAY, OF PROVINCETOWN, ASSIGNOR TO HIMSELF, Z. D. RICH, OF SOMERVILLE, AND JOSEPH HALL, OF CAMBRIDGE, MASSACHUSETTS.

Letters Patent No. 90,952, dated June 8, 1869.

IMPROVEMENT IN SHIFTING CLEATS, OR RING-BOLTS, &c.

The Schedule referred to in these Letters Patent and making part of the same.

*To all whom it may concern:*

Be it known that I, JOHN E. MURRAY, of Provincetown, in the county of Barnstable, and State of Massachusetts, have invented a new and useful Shifting Cleat, Ring-Bolt, Hook, &c.; and I do hereby declare that the following is a full, clear, and exact description of the construction and operation of the same, reference being had to the accompanying drawing, forming a part of this specification.

This invention consists in providing a shifting-cleat, ring-bolt, &c.

I have a metal-socket, permanently fastened into a vessel's deck, or where it may be required for use, the head thereof to be left flush with the vessel's deck, with a screw aperture for inserting the ring-bolt, cleat, &c., as they may be required for use, said screw-aperture to be closed by a screw-plug when not required for use.

This is an invention that has been long desired, and is particularly adapted for use on ship-board.

I will proceed to describe its construction and operation.

I construct my socket, as shown in the accompanying drawing, of metal, with an outside or male screw, with an aperture in the head thereof, said aperture to be closed at the bottom and to have an inside or female screw, and, when not required for use, to be closed with a screw-plug. For more securely fastening the socket, I attach a burr or nut, to be screwed into the foot of my socket.

This socket is to be permanently screwed into the vessel's deck, the head thereof to be left flush, the cleat, ring-bolt, &c., to be abutted by a screw, as required for use, and having, on the foot of each, a bite, or wrench, which, when inserted into the plug by screwing the cleat or ring-bolt, screws the plug into the socket, and thus I have a cleat or ring-bolt which can be shifted at a moment's notice, as required for use.

In the annexed drawing, making part of this specification—

A represents the socket, with an outside or male screw, with an aperture in the head thereof, said aperture to be closed at the bottom and to have an inside or female screw, and when not required for use to be closed with screw-plug B. For the more securely fastening my socket A, I attach a burr or nut, C, to be screwed into the foot of the socket A.

The cleat D and the ring-bolt E to be abutted by a screw to the screw-plug B, as required for use.

On the foot of the cleat D, ring-bolt E, &c., is a bite or wrench, F, by which means the plug B, having an aperture, is forced to the foot of the aperture in the socket A by screwing in the cleat D or ring-bolt E, &c.; and thereby the cleat D or ring-bolt E, &c., is firmly abutted, thus forming a cleat or ring-bolt that can be shifted at a moment's notice.

What I claim as my invention, and desire to secure by Letters Patent, is—

A shifting cleat, ring-bolt, or hook, composed of socket A, screw-plug B, burr or nut C, cleat D, or ring-bolt E, all constructed, arranged, and operated in the manner as and for the purposes set forth.

JOHN E. MURRAY.

Witnesses:
   CHAS. H. PATTEE,
   J. K. TYLER.